Jan. 9, 1951     T. J. REINHART ET AL     2,537,704
PLANER GAUGE
Filed Feb. 14, 1945     2 Sheets-Sheet 1
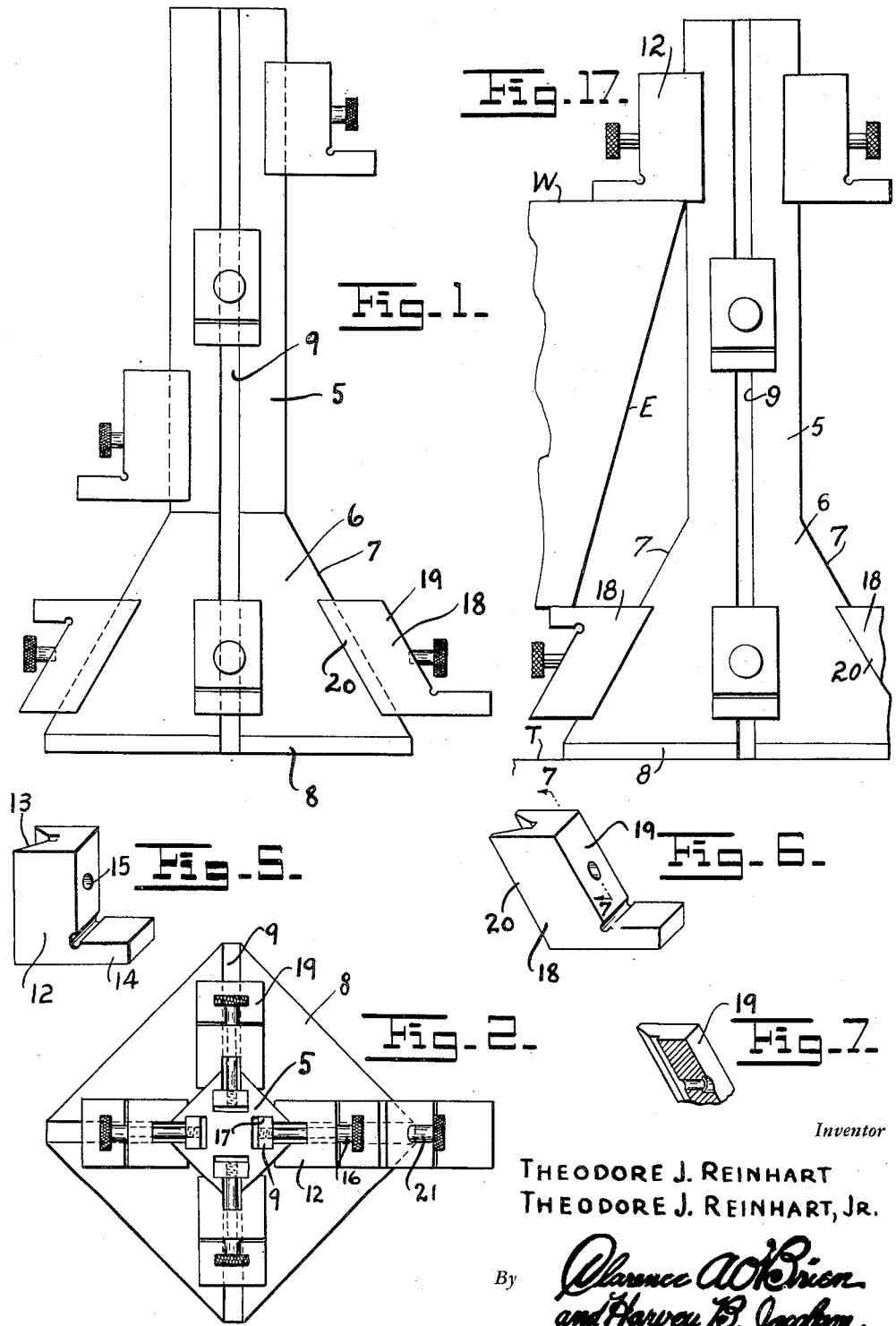
Inventor
THEODORE J. REINHART
THEODORE J. REINHART, JR.

Jan. 9, 1951  T. J. REINHART ET AL  2,537,704
PLANER GAUGE
Filed Feb. 14, 1945  2 Sheets-Sheet 2
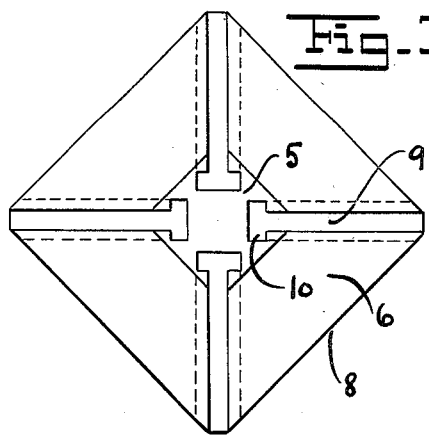
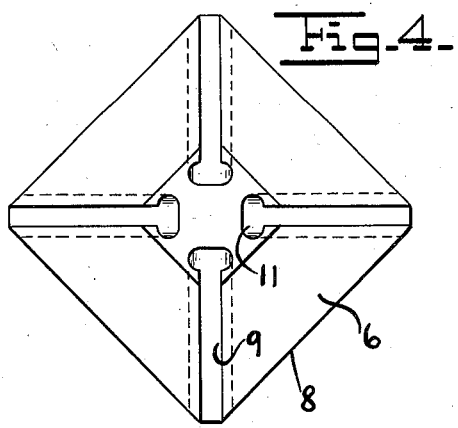
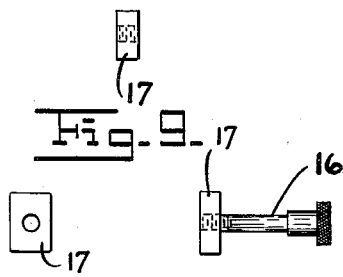
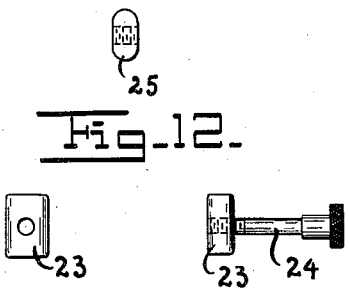
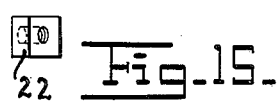
*Inventor*
THEODORE J. REINHART
THEODORE J. REINHART, JR.
By *Clarence A. O'Brien
and Harvey B. Jacobson*
*Attorneys*

Patented Jan. 9, 1951

2,537,704

UNITED STATES PATENT OFFICE 2,537,704

PLANER GAUGE

Theodore J. Reinhart and Theodore J. Reinhart, Jr., Cleveland, Ohio

Application February 14, 1945, Serial No. 577,810

1 Claim. (Cl. 33—169)

The present invention relates to new and useful improvements in gauges generally and more particularly to a planer gauge for use in machine shop work and of a type adapted for checking and inspecting jigs, fixtures and other tools.

In conventional types of gauges of this character in order to obtain different dimensions it is necessary to change the gauge block from one position to the other and then back to the original position for checking, thereby consuming considerable time in checking and inspecting the work.

Accordingly, it is an object of the present invention to avoid the frequent changes in the setting of the gauge block and to provide a support having a plurality of gauge blocks adjustably mounted thereon so that each may be used for determining the different dimensions of the work without necessitating resetting thereof.

A further object of the invention is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a top plan view.

Figure 3 is a top plan view with the gauge blocks removed.

Figure 4 is a similar view illustrating a modified form of block for clamping the gauge blocks in adjusted position.

Figure 5 is a perspective view of one of the gauge blocks.

Figure 6 is a similar view of another of the gauge blocks.

Figure 7 is a fragmentary sectional view taken substantially on a line 7—7 of Figure 6.

Figure 8 is a side elevational view of one of the clamping screws.

Figure 9 is a side elevational view of the nut for the clamping screw.

Figure 10 is a front elevational view thereof.

Figure 11 is a side elevational view of the clamping screw with nuts for a round-shaped slot.

Figure 12 is a side elevational view of the nut.

Figure 13 is a front elevational view thereof.

Figure 14 is a side elevational view of a clamping screw and nut for the inclined lower slot.

Figure 15 is a side elevational view of the nut for the inclined slot.

Figure 16 is a front elevational view thereof, and

Figure 17 is a view in side elevation drawn to a reduced scale and illustrating one use of the gauge.

Referring now to the drawings in detail wherein for the purpose of illustration we have disclosed a preferred embodiment of the invention, the numeral 5 designates a post of square shape in cross section having a flared lower end 6 provided with inclined sides 7 and forming a flat bottomed base 8 at its bottom portion. The corners of the post 5 are formed with longitudinally extending slots 9 continuing downwardly through the corners of the flared lower portion 6 and base 8 and the slots may be constructed in the form of T-slots as shown at 10 in Figure 3, or the slots may be of modified T-slot formation with rounded inner ends as indicated at 11 in Figure 4 of the drawings.

A plurality of gauge blocks 12 are provided with a substantially V-shaped groove 13 extending vertically along its inner surface and the lower edge of the blocks are formed with an outwardly extending flange or shoulder 14.

The blocks 12 are also formed with an opening 15 adapted for receiving a clamping screw 16 having a nut 17 threadedly connected at its inner end for traveling in the head portion of the slot, the screw and nut thus serving to clamp the gauge block in adjusted position in the slot 9 as will be apparent from an inspection of Figure 1 of the drawings.

The gauge blocks 18 provided for attaching to the inclined lower portion 6 of the support have inclined front and rear surfaces 19 and 20 paralleling the sides of the inclined lower portion 6 and are likewise secured in vertically adjusted position by the screws 21 and inclined nuts 22.

The nuts 23 attached to the screws 24 for adjustment in the round headed T-slot 11 are rounded on their vertical edges as indicated at 25.

From the foregoing it will be apparent that one of the gauge blocks 12 may be adjustably mounted at each corner of the post 5 and one of the gauge blocks 18 may likewise be adjustably mounted at each corner of the inclined lower portion 6 of the supporting member and by providing a plurality of gauge blocks on a single supporting member various dimensions of a number of pieces of work may be checked after the gauge is set without necessitating resetting of the several blocks.

As an example of how the described gauge is adapted to be used, let it be assumed that an elongated piece of work W clamped in upright position by a jig, not shown, on a machine table T is to be checked as to length. This is done by checking the distance of the upper and lower surfaces of the piece of work from the table and the gauge blocks 12, 18 at one corner of the post 5 are used as a pair and set in any suitable manner, along said corner at distances from the bottom of the base 8 corresponding with the height at which the upper and lower surfaces of the piece of work should be from the table T, if the piece of work W is of proper length, and then checking said surfaces with the settings of said gauge blocks by placing the gauge on the table T upright and sliding the base 8 over said table T toward the work W so that the gauge blocks 12 and 18 will straddle the work with the blocks 12, 18 engaging the lower and upper surfaces of the work W if the work is of the right length, and as shown in Figure 17. As will be seen, the gauge block 18 of the pair is caused to be adjusted laterally and vertically of said bottom and of the block 12 because of the inclined side or edge 7 of the corner along which it is set, whereas, the gauge block 12 is set along a line perpendicular to said bottom and table. This provides for using the pair of gauge blocks 12, 18 for straddling a piece of work at one edge E thereof vertically inclined relative to the table, and without tilting the post 5 on the table.

It is believed that the details of construction and manner of use of the device will be readily understood from the foregoing without further detailed explanation.

Having thus described the invention, what we claim is:

A gauge of the class described comprising a squared post having a downwardly flared enlarged lower end with a flat bottom for supporting the post upright on a machine table and stabilizing said post, said flared end forming with the remainder of the post a vertical corner on the post including a lower edge inclined with respect to said bottom and an upper edge perpendicular to said bottom, an upper gauge block slidably mounted on said corner and adjustable along said perpendicular edge in a line perpendicular to said bottom, and a lower gauge block slidably mounted on said corner and adjustable along said inclined edge both vertically and laterally of said bottom and upper block, whereby when said upper and lower blocks are adjusted relative to said bottom according to the distance from said table of upper and lower surfaces of a piece of work fixed above the table in vertical position with a vertically inclined edge, said post may be slid on said table to position said upper and lower blocks in straddling relation to said inclined edge of the work with the upper and lower blocks engaging said upper and lower surfaces of the work.

THEODORE J. REINHART.
THEODORE J. REINHART, Jr.

REFERENCES CITED

The following references are of record in the file of this patent:

UNITED STATES PATENTS

| Number | Name | Date |
|---|---|---|
| 333,631 | Holz et al. | Jan. 5, 1886 |
| 338,444 | Seargeant | Mar. 23, 1886 |
| 833,917 | Burchardi | Oct. 23, 1906 |
| 1,676,360 | Schwartz | July 10, 1928 |

FOREIGN PATENTS

| Number | Country | Date |
|---|---|---|
| 634,636 | France | Nov. 28, 1927 |